Aug. 3, 1937.  H. W. JONES  2,089,029
CONTROL SYSTEM FOR WELDING AND LIKE OPERATIONS
Original Filed Aug. 24, 1932  3 Sheets-Sheet 3
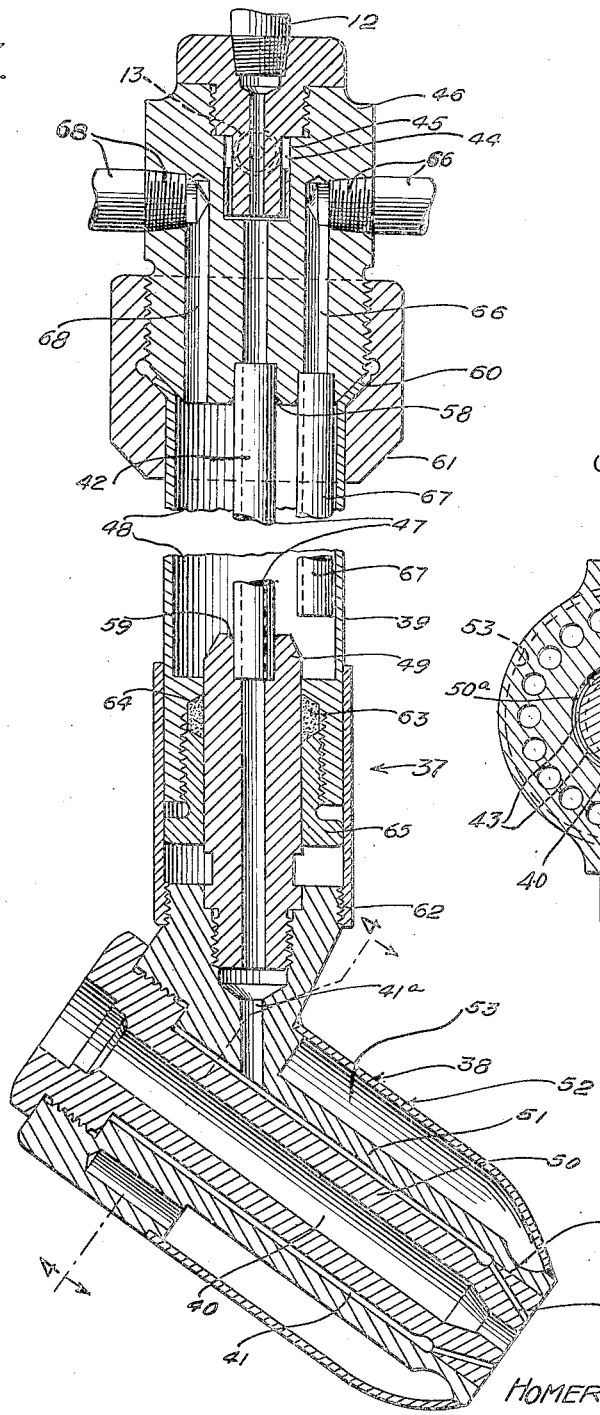
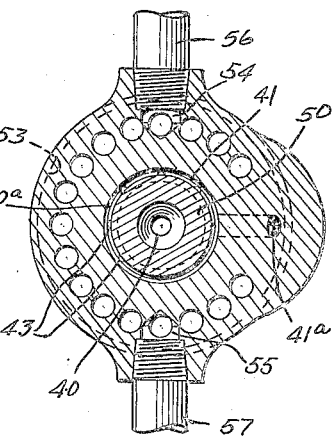
INVENTOR
HOMER W. JONES
BY
ATTORNEY Patented Aug. 3, 1937

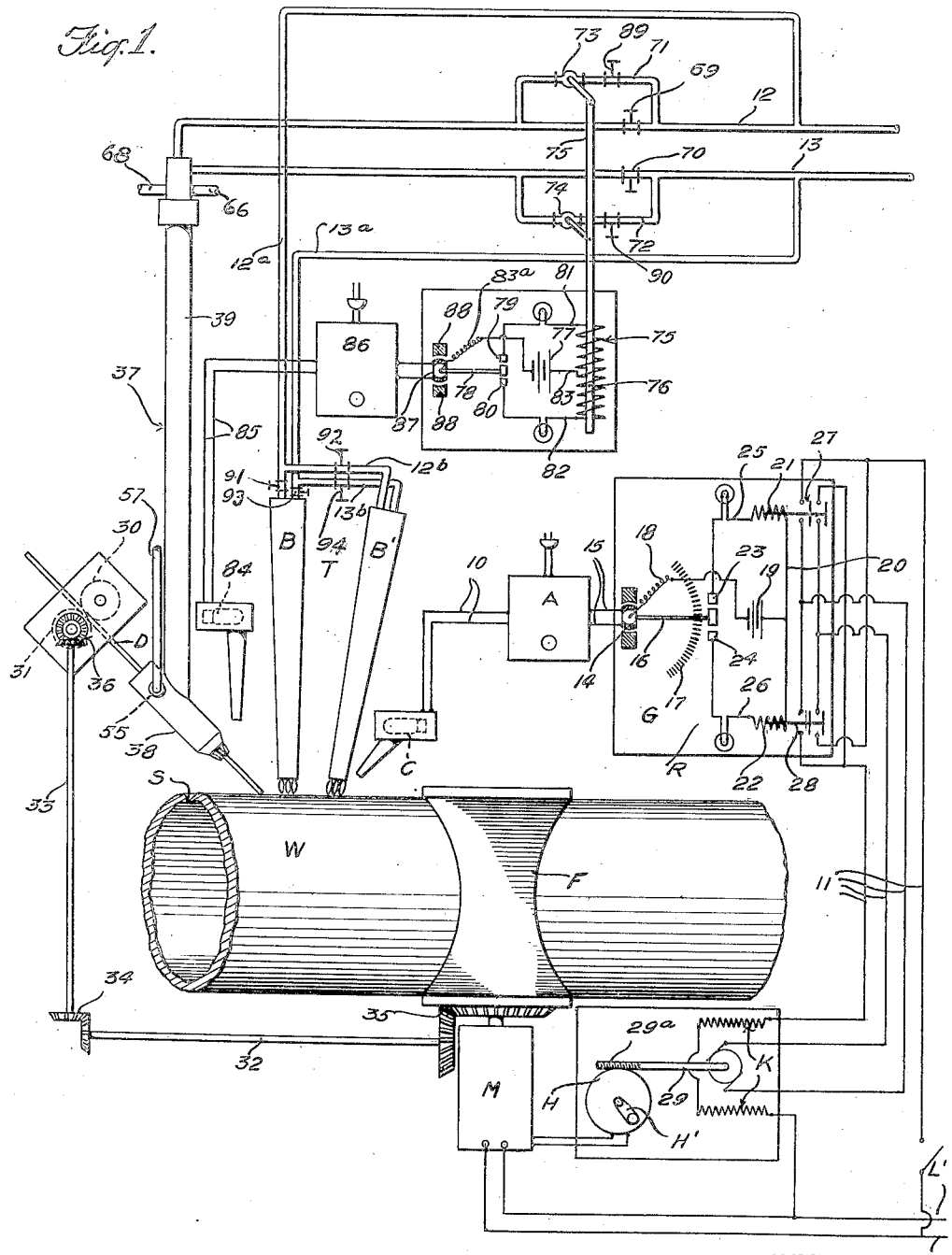

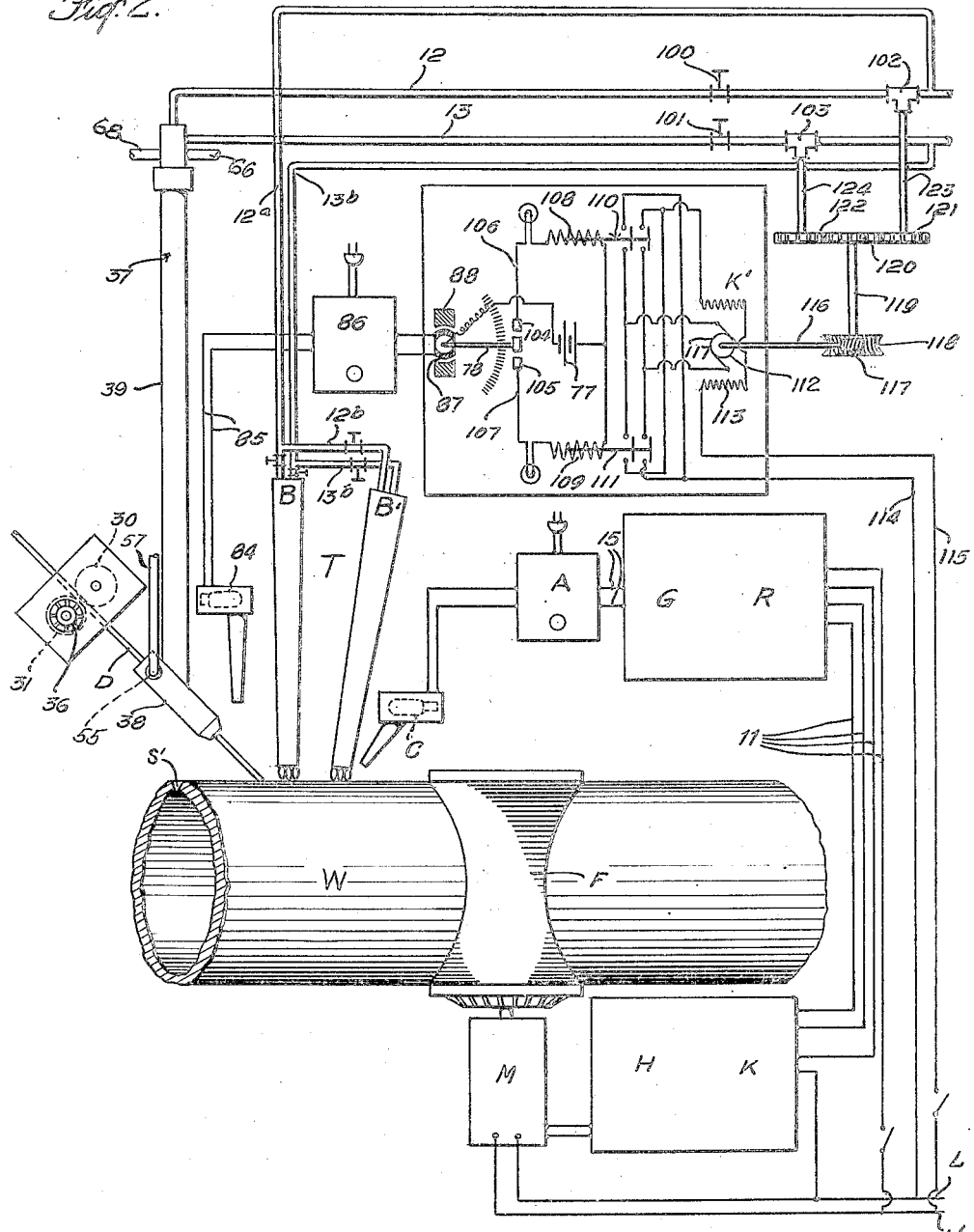

2,089,029

UNITED STATES PATENT OFFICE 2,089,029

CONTROL SYSTEM FOR WELDING AND LIKE OPERATIONS

Homer W. Jones, Westfield, N. J., assignor, by mesne assignments, to Union Carbide & Carbon Corporation, a corporation of New York Application August 24, 1932, Serial No. 630,187
Renewed February 26, 1937

34 Claims. (Cl. 113—59)

This invention relates to the art of welding metals and more particularly to systems operable under automatic or semi-automatic control for producing a weld of uniform excellence in quality. The invention is an improvement upon that disclosed in the copending application of James H. Bucknam and Lloyd W. Young, Serial No. 542,963, filed June 8, 1931.

In systems of this character, it is customary to mechanically feed work to and past the point of applying the weld preferably under automatic or semi-automatic control and in such manner as to maintain the temperature in the welding region uniform and the size and temperature of the welding puddle constant. This is accomplished in accordance with the invention of Bucknam et al. referred to above by feeding the work being operated upon under the welding apparatus by means of a motor, the speed of which is under control of means, as a photo-electric cell, responsive to changes in radiant energy emitted by heated portions adjacent the welding region. While such apparatus maintains satisfactory conditions at the welding point under ordinary circumstances, problems arise when it is desired to introduce additional material at the welding point for affecting the resulting product, which problems must be properly integrated into the final result if uniformity of product is to be maintained. It is necessary, to this end that the quantity of added material fed to the puddle per linear unit of weld remain fixed and that the temperature of the material so fed should be kept constant throughout the welding operation. It is ordinarily desirable therefore to preheat this material progressively by suitable means, and introduce the same to the welding point at a rate proportional to the movement of the work past that point. If the heat delivered to the added material is kept quantitatively constant when the feeding of the work and, in consequence, feeding of added material is increased, the heat will be distributed over a greater amount of material and the temperature thereof will be lowered. This will cool the puddle below the desired temperature with the result of a poor weld. Conversely, when the speed of the work and feed of added material is lowered, the puddle will become overheated with the possibility of a "burn through" or other damage to the work.

It is an object of this invention, therefore, to provide a novel process and, in a system of the above character, novel means for carrying out the process whereby the temperature of material being added to work may be maintained uniform regardless of variations in the quantity thereof added in unit time, and novel means for effectively supplying the added material quantitatively in synchronism with the feed of the work.

A further object of the invention is to provide a novel process including the preheating of material being added to a weld, and novel means for facilitating the carrying out of the process to automatically control the preheating of the material being added to a weld; said means being responsive to radiant energy emitted by a portion of the preheated region of said material.

A still further object of the invention is to provide a novel process and automatically operating means for facilitating the process whereby the quantity of heat supplied to the material being added to a weld will be varied proportionally to the quantity of material supplied.

In accordance with this invention, there may be included in a novel welding process, in which material is added to the work at the welding point concurrently with the feed of the work into a welding region, means for heating the material as it is being added, and a device for controlling said heating means which is responsive to variations in the radiant energy emitted from the heated regions of the work. These may also be provided in a system of the above character for carrying out the process, a driving connection between the work feeding means and that for feeding welding material to the welding point, whereby the feed of the work and of the material will be synchronized. There may also be included in the system, means for preheating the material being added and means, as a photoelectric cell, responsive to variations in radiant energy emitted by a portion of the preheated region of such material; said last-named means being in automatic control of the means for preheating the material. This control, in case the preheating means is in the nature of an oxy-gas blowpipe, may be exercised through suitable mechanism for varying the opening and closing of valves in control of the flow of gases to the blowpipe.

The above and other objects and novel features of the invention will be apparent from the following specifications taken with the accompanying drawings, in which, Fig. 1 is a view showing diagrammatically one form of the invention.

Fig. 2 is a diagrammatic view showing a variation from the form shown in Fig. 1.

Fig. 3 is a detail view of a blowpipe on an enlarged scale especially adapted for systems such as those including the present invention; the same being shown in longitudinal section.

Fig. 4 is a section taken substantially along the line 4—4 of Fig. 3.

In Fig. 1 of the drawings, the invention is shown as included in mechanism such as that of the above-mentioned Bucknam et al. invention. This mechanism comprises briefly a pair of rolls F which are shown in relation to work W in the nature of a tubular metallic body which is being fed axially by the rolls along a course and beneath welding apparatus T for the production of a longitudinal seam S between its opposing edges. The rolls F are driven by a variable speed motor M, the variations in the speed of which are under control of radiant energy responsive means as a photoelectric cell C focused on the work in the welding region so as to be influenced by the radiant energy emitted therefrom. The cell C is included in an electric circuit 10 and the variations in the current set up therein, responsive to the heat conditions in the welding region, are transmitted to the armature and field winding of a reversible control motor K, preferably after amplification as by a thermionic amplifier A, through conductors 11 which are connected with a suitable source of electrical energy through leads L, L' and are connectible in circuit by means of relay mechanism R which is under influence of current set up in the circuit of the photoelectric cell. In this arrangement, the reversing of the control motor serves to operate a rheostat H for cutting resistances into and out of the field circuit of the motor M so that its speed is varied in response to variations in current set up in circuit 10 due to changes in the condition of the weld. To this end the armature shaft 29 of motor K is in driving connection with the contactor H' of rheostat H through a worm and worm wheel connection 29a.

The welding apparatus T referred to above may comprise a welding blowpipe B and a preheating blowpipe B' connected with oxygen and fuel gas mains 12 and 13 through branch pipes 12a, 13a and 12b, 13b respectively. The relay mechanism R includes a milliammeter G having a coil 14 included in the output circuit 15 of amplifier A. A pointer 16 is secured to the coil for actuation thereby and so as to move over a scale 17 for indicating the radiant energy fluctuations due to changes in condition of the weld. The pointer 16 is connected by a conductor 18 with one pole of a battery 19, the other pole thereof being connected to a conductor 20 intermediate its ends. The opposite ends of the conductor 20 are respectively connected each to one end of solenoids 21 and 22 respectively, and the opposite ends of these solenoids are connected respectively to terminals 23 and 24 by means of conductors 25 and 26. Obviously the circuit through solenoid 21 will be made by contact of the pointer 16 with terminal 23 and the circuit through solenoid 22 by contact of the pointer with terminal 24. When one or the other of the circuits is energized the solenoid included therein will operate switch mechanism 27 or 28 as the case may be to close circuit 11 and, according to the switch operated, will pass current through circuit 11 in one or the other of opposite directions, thereby rotating the armature of the reversible control motor K in either its forward or reverse direction so as to vary the speed of motor M.

In operation, the pointer 16 is set midway between contacts 23 and 24 for normal heat conditions of the weld and, when the heat conditions fall below this normal, the pointer will make contact with one of the terminals 23, 24 sending current through circuit 11 including the field windings and armature winding of motor K in one direction thereby slowing the motor M and, when the heat conditions rise above the normal, with the other terminal, sending current through circuit 11 in the opposite direction and thereby increasing the speed of motor M. The slowing and increasing of the motor speed of course results in similar changes in the feed of the work by motor M so that the heating thereof at the welding point will be kept uniform.

Application of one form of invention to the apparatus as outlined above may comprise the addition of material to the welding point, and in the present embodiment, a welding rod D is used to supply additional metal to the welding puddle. Where additional material is used, it is necessary, as stated above, that the same be fed to the welding puddle quantitatively in proportion to the rate of movement of the work conveyed past the welding point by rolls F. To this end, the rod D is fed in synchronism with the work by suitable means as feed rolls 30 and 31, one or both of which may be in driven connection with one of the rolls F. Such a connection is shown as consisting of shafts 32 and 33 in driving connection by gears 34; shaft 32 being in driven connection with one of the rolls F by gears 35, and shaft 33 in driving connection with one of the rod feed rolls through gears 36.

In order to preheat the rod D as it is progressively delivered to the puddle, a blowpipe 37 is provided having a head 38 supported by a stem or handle 39; the head being conveniently provided with a guide passage 40 axially therethrough for directing the rod to the puddle. Surrounding the guide passage and coaxial therewith is a gas passage 41 connected with a passage 42 extending axially through the handle and adapted to supply a combustible mixture through outlets 43 at the nose end of the head. These outlets are preferably inclined toward the rod supported in the passage so as to deliver the preheating jets at a converging angle thereagainst for better utilizing the heat value thereof. The component gases of the combustible mixture, as oxygen and acetylene, are delivered to the passage 42 from mains 12 and 13 through a mixer 44 located in the bore 45 of a mixer body 46. Passage 42 comprises a tubular conduit 47 located within the casing 48 of the handle and extending between the body 46 and a tubular nipple 49 threadedly connected to the head 38. The gas passage 41 within the head is provided by the cooperation of separable coaxial tubular members 50 and 51 threadedly connected at their rear ends, the bore of the member 50 constituting the guide passage 40 and the tubular space between members 50 and 51 constituting the gas passage 41. The lower end of member 50 is enlarged at 50a to fill the bore of member 51, and to make a gas tight fit therewith and this enlarged portion is bored to provide the outlets 43 described above. A passage 41a through the head, forms a connection between the bore of the nipple 49 and passage 41.

The member 51 is surrounded with a tubular wall 52 spaced therefrom and hermetically sealed thereto at its upper and lower ends to provide a water jacket space 53 extending the greater portion of the length of the head from the lower end thereof. Inlet and outlet ports 54, 55 connect with this space to which may be connected tubes 56, 57 to provide circulation of water through the water jacket space. The passage 42 may also be waterjacketed by providing liquid tight connections between both the casing 48 and conduit 47 at their upper and lower ends and the body 46 and head 38 respectively. To this end the body and head are counterbored to receive the ends of conduit 47 and these members are chamfered at the ends of these counterbores to accommodate sealing means between the tube and these members as rings of silver solder 58 and 59. The upper end of the casing 48 is flared at 60 and is pressed against the lower end of the mixer body by clamping nut 61 to provide a watertight seal between these members. The lower end of the mixer body is of conical shape to correspond to and snugly fit the flared portion 60 of the tubular body and a threaded connection between the nut and the mixer body is provided whereby the members may be drawn tightly together. The lower end of the casing 48 is secured to the head 38 by a threaded connection at 62 and a watertight seal between this end of the casing and the nipple is provided by a packing 63 surrounding the nipple and compressed against a shoulder 64 formed internally of the casing by means of a gland nut 65 threaded into the lower end of the casing. Water is admitted to the interior of the casing through a port 66 passing by a tube 67 to the lower end of the chamber within the casing and out through an outlet port 68 at the upper end of the casing.

Flow of oxygen and fuel gas through the mains 12 and 13 to the mixer 44 of the preheating blowpipe 37 is under control of suitable throttle valves 69 and 70 which may be of the needle or globe type and which, in operation, are preferably adjusted by hand to give the minimum flame required, that is, so as to pass the amount of gas required for the slowest welding speed or slightly less than that required for any given speed. These valves are preferably located in the mains 12 and 13 between the branches 12a, 12b; 13a, 13b, and the blowpipe 37 and serve to provide during the welding operation fixed orifices in the mains which, in conjunction with automatically variable orifices, supply to the blowpipe a fixed quantity of each of the gases making up the combustible mixture. The variable orifices are located in conduits 71 and 72 which bypass the valves 69 and 70 and are controlled by valves 73 and 74, preferably of the poppet or plunger type. These latter valves are under automatic control of variations in the preheat condition of the rod D being fed to the puddle so as to maintain this condition uniform. To this end, these valves, as shown in Fig. 1, are connected to a bar 75 of magnetizable material which comprises the core of a solenoid 76 included in circuit with a battery 77 and a swingable arm 78 adapted to make contact with either of two terminals 79 or 80 connected each with one end of the solenoid respectively by conductors 81 and 82. The solenoid is connected intermediate of its ends to one of the battery poles by a tap 83, the other pole of the battery being conductively connected to the swingable arm by conductor 83a. By this arrangement, when the arm makes contact with terminal 79, current will be passed through the portion of the solenoid included in the circuit in one direction and, when it contacts with terminal 80, current will be passed through the other portion in the opposite direction whereby the magnet 75 will be moved in opposite directions for opening or closing the valves 73 and 74 according as contact is made with one or the other terminal.

The arm 78 is under automatic control of radiant energy emitted from the preheated region of the rod D through radiation responsive means, as the photoelectric cell 84 in circuit by means of conductors 85 with amplifying means, as a thermionic amplifier 86, the output of which is in circuit with the coil 87 similar to coil 14 which is placed between the poles 88 of a magnet and is adapted therefore to rotate when current is passed therethrough. Arm 78 is secured to this coil so as to rotate therewith when current flows through the coil responsively to variations in heat intensity in the preheated region of the rod D.

In practice, the arm 78 is set halfway between contacts 79 and 80 for a predetermined normal preheat condition of rod D at the point upon which the photo-electric cell 84 is focused. Any variation of this heat condition will cause either an increase or decrease of current relative to a predetermined normal in the circuit of the cell which will be relayed through the arm 78 to the solenoid 76 to flow therethrough in a direction determined by the contact of the arm with terminals 79 or 80 as determined by the character of the current set up in circuit 85 by the cell.

Hand operable throttle valves 89 and 90 may be provided in bypass conduits 71 and 72 and branch passages 12a, 12b, 13a and 13b may also be under manual control of throttle valves 91, 92, 93, 94 respectively.

In operation, where the work W is being fed beneath the welding apparatus by rolls F, the rod D will be fed synchronously therewith into the welding puddle through the driven connection of feed roller 31 to roller F. The heat changes of the welding region above and below a given normal will be communicated through photo-electric cell C, relay R, and control motor K to variable speed motor M through the rheostat H so that the speed with which the rolls feed the work will be responsive to the said heat changes; the work being speeded up with heat changes above and slowed with changes below the given normal. The rod feed will also be speeded up or slowed responsive to the speeding up or slowing of the work. The resulting variations of the preheat conditions of rod D from the predetermined normal, incident to the variation in feeding speed will be compensated for by a greater or less amount of combustible mixture being fed to the blowpipe 37 with a resultant increase or diminution of the preheating flame of said blowpipe. By the above combination of apparatus, therefore, it is clear that the relation between the preheating of both the work and the added welding material will be maintained substantially uniform.

The form of apparatus illustrated in Fig. 2 varies from that shown in Fig. 1 primarily in the manner of controlling the flow of gases to the rod preheating torch 37. In this form of the invention the mains 12 and 13 between conduits 12a, 12b, 13a, 13b and the blowpipe 37 are controlled by manually operable throttle valves 100 and 101 and valves 102 and 103 similar to valves 73 and 74. Bypasses may or may not be employed. As shown valves 102 and 103 are located in the mains 12 and 13 and no bypass is used. Under these conditions the valves 102 and 103 are set for a normal flow of gases to the blowpipe which will sustain the desired preheating conditions for a normal feed of rod D. A photo-electric cell 84 is focused on the rod D as in Fig. 1 and is in circuit with amplifying means 86, the output of which is in circuit with a coil 87 to which an arm 78 is attached for rotation therewith under influence of the magnet 88 when the flow of current through the coil is varied in one or the other direction. The arm 78 is conductively connected with one pole of a battery 77 and contacts 104 and 105 are conductively connected with its other pole through conductors 106 and 107 which include respectively solenoids 108 and 109. Each solenoid controls a related switch, as switches 110 and 111, for closing a circuit through the armature 112 and field winding 113 of a reversible motor K'; the circuit including branches 114 and 115 from the leads L, L'.

The armature 112 will rotate clockwise or counterclockwise according to the direction of the current passed through its windings which, of course, depends upon which of the switches 110 or 111 is closed. This in turn depends on which terminal 104 or 105 the arm 78 makes contact with in response to the fluctuation of current in circuit 85 as determined in turn by the variations in radiant energy emitted by rod D at the point on which the photo-electric cell 84 is focused. The armature shaft 116 has a worm 117 secured thereto in driving relation to a worm wheel 118 which is connected by a shaft 119 with a gear 120. The gear 120 is in turn in driving relation to gears 121 and 122 which, through shafts 123 and 124, serve to vary the opening or closing of the valves 102 and 103 from a predetermined normal for which the valves are set at the beginning of a welding operation.

It is believed that the operation of this second form of the invention will be clear from the above description and it is to be understood that variations from these forms and other means for controlling the preheating of welding material may be resorted to within the scope of this invention.

While the principles of the invention have been set forth herein in several modifications, as applied to welding, it is intended to include within its scope all situations where metallic material is being bonded to a metal body, as in weld depositing a surface of one metal onto the surface of another. The heating apparatus, also, may be electric as well as gaseous or may be a combination of both and other heat responsive control means may be employed in place of the photo-electric cell if found desirable or convenient. Various other modifications may also be made in details of the apparatus and method disclosed without departing from the principles of the invention or sacrificing its advantages.

I claim:

1. In welding apparatus, the combination of means for forming a weld between opposing metallic surfaces; means for supplying welding material to the welding point; heating means for progressively heating the welding material as it is being fed; and means whereby said heating means is controlled by radiant energy emitted by the heated welding material.

2. In welding apparatus, the combination of means for progressively forming a weld between opposing metallic surfaces while progressively supplying added material to the weld; means for progressively heating the material as it is being added; and means regulating the heating of said material responsively to variations in radiation from the heated region of the material.

3. In welding apparatus, the combination of means for concurrently feeding work and welding material to a welding region for forming a weld between opposing edges of the work; means for preheating the welding material progressively as it is being fed; and means responsive to radiant energy emitted from the preheated welding material for controlling the preheat supplied thereto.

4. In welding apparatus, the combination of means for progressively forming a weld between opposing metallic surfaces and for feeding additional material to the weld as it is being formed; means for preheating the material progressively as it is being added; and means automatically operating responsive to the heat of the preheated material for maintaining constant the quantity of heat applied to a unit quantity of material.

5. In welding apparatus, the combination of means for progressively forming a weld between opposing metallic surfaces; means for progressively adding material to the weld as it is being formed; and means for progressively pre-heating the material to a predetermined value of temperature as it is being added; and means for varying the quantity of heat supplied by said preheating means as the temperature of the heated material varies from the predetermined value, such variations in the quantity of heat supplied being responsive to such temperature changes and tending to reestablish such predetermined value of temperature.

6. In welding apparatus, the combination of means for feeding work and welding material concurrently into a welding region; means for supplying welding heat to the work; means for preheating the welding material as it is being fed; means responsive to changes in radiant energy emitted by said welding region for varying the amount of welding heat supplied thereto; and means responsive to changes in radiant energy emitted by said preheated welding material for varying the amount of preheat supplied thereto.

7. In welding apparatus, the combination of means for feeding work and welding material concurrently into a welding region; a blowpipe for preheating the welding material as it is being fed; conduits for conducting gases to the blowpipe for supporting combustion; and means responsive to radiant energy emitted from the preheated material, for varying the flow of gases through said conduits.

8. In welding apparatus, the combination of means for forming a weld between opposing surfaces; means for feeding added material into the weld; means for preheating the material progressively as it is being added, said preheating means comprising a blowpipe and a conduit for conducting gas thereto, said conduit having an orifice therein adapted to pass a predetermined quantity of gas therethrough; and a conduit by-passing said orifice and having a variable orifice; and means for varying the orifice in the bypass responsively to radiant emanations of the preheated region of the material.

9. In welding apparatus, means for progressively feeding welding material to the welding point; a blowpipe for progressively preheating the material as it is being fed; a conduit continuously supplying fuel to the blowpipe; and means under automatic control of the radiations from the material for augmenting or decreasing the supply of fuel.

10. In welding apparatus, means for forming a weld between metallic surfaces; including means for feeding welding material to the weld and a blowpipe for preheating the material as it is being fed; a conduit for conducting gas to the blowpipe and a valve in the conduit adapted to be set for a normal flow of gas through the conduit and means responsive to the radiant energy emitted by the heated region of the material for varying the position of the valve from its normal position.

11. In welding apparatus, means for forming a weld between metallic surfaces; including means for feeding welding material to the weld and a blowpipe for preheating the material as it is being fed; a conduit for conducting gas to the blowpipe and a valve in the conduit adapted to be set for a normal flow of gas through the conduit; and means responsive to changes in radiant energy emitted by the preheated material including a reversible motor and gearing driven thereby for varying the position of the valve from that for which it is normally set.

12. In welding apparatus, means for progressively heating a welding rod being fed to a welding point, and means operating responsively to the temperature of the heated portion of the rod to correctively vary the quantity of heat supplied to the rod when the temperature of the rod varies from a predetermined normal.

13. In welding apparatus, means for progressively heating a welding rod being fed to a welding point; and photo-electric means operating responsively to the temperature of the heated portion of the rod to correctively vary the quantity of heat supplied to the rod when the temperature of the rod varies from a predetermined normal.

14. In welding apparatus, means for progressively uniting welding material to a metallic body; means providing a gas fed flame for preheating the material as it is being added; and means operating responsively to radiant energy emitted from the welding material to correctively vary the feed of gas when radiant energy from the welding material varies from a predetermined normal.

15. In welding apparatus, means for progressively uniting welding material to a metallic body; means providing a gas fed flame for preheating the material as it is being added; and photoelectric means operating responsively to radiant energy emitted from the welding material to correctively vary the feed of gas when radiant energy from the welding material varies from a predetermined normal.

16. In welding apparatus, the combination of means for progressively and synchronously feeding work and welding material to a point of weld formation; means for heating the work at said point; means for preheating the welding material progressively during the feeding thereof; and means under control of the heated regions respectively of the work and the material for separately controlling the heating of each thereof so as to maintain the heat of the respective heated regions substantially constant.

17. The process of progressively uniting metallic material to a metallic member at a high temperature comprising; preheating the material as it is being moved into contact with the said member; and varying the heat applied to the material with changes in radiant energy emitted by the material so as to maintain the material added to said member at a substantially uniform temperature.

18. The process of welding a seam between metallic surfaces which comprises the heating of said edges progressively to welding temperature; progressively supplying metallic material to the welding region and concurrently preheating the material being added; and varying the amount of preheat supplied to the material with variations in radiant energy emitted therefrom so as to maintain the heated material supplied to the welding region at a substantially uniform temperature.

19. The process of combining metallic material with a metallic member in a welding region, comprising concurrently heating the work in said region and the material supplied thereto; and varying the amount of heat applied to successive portions of the work and to the material with changes in radiant energy emitted from the respective heated portions so as to maintain the welding region at a substantially uniform temperature and to maintain the material supplied to the welding region at a substantially uniform temperature.

20. The process of progressively uniting metallic material to a metallic member, which comprises feeding said material and member through a preheating zone to a welding zone at a rate capable of being varied, preheating said material in the preheating zone to a selected temperature, and maintaining said material at said preheating temperature irrespective of variations in the rate of feed of the preheated material to the welding zone.

21. The process of progressively uniting metallic material to a metallic member, which comprises feeding said material and member to a welding zone at a rate capable of being varied, preheating said material to a selected temperature, and regulatably varying the preheat of said material in accordance with variations in the rate of feed of the preheated material to the welding zone, thereby continuously maintaining the preheated material substantially at said selected temperature.

22. The combination of means for applying a localized high-temperature heating medium to a metal body; mechanism for causing continuous relative movement of said body and such heating means to heat successive portions of said body; a device driven by said mechanism for feeding material to be deposited on said body; and means responsive to variations in radiant energy emitted by such heated portions for controlling said mechanism.

23. The combination of means for applying a localized high-temperature heating medium to a metal body; mechanism for moving said body and such heating means relatively to one another to heat successive portions of said body; a device, driven by said mechanism, for feeding weld metal to be deposited upon such heated portions; and means responsive to variations in radiant energy emitted by such heated portions for controlling the heating of said successive portions by said heating means.

24. The combination of means for applying a localized high-temperature heating medium to a metal body; mechanism for moving said body and such heating means relatively to one another to heat successive portions of said body; a device, driven by said mechanism, for feeding weld metal to be deposited upon such heated portions; and means, responsive to radiant energy emitted by said heated portions, for controlling the heating of said successive portions by said heating means.

25. The combination of means for applying a localized high-temperature heating medium to a zone within spaced boundaries of a metal body; mechanism for causing continuous relative movement of said body and such heating means to heat successive portions of said body; a device operated in timed relation with said mechanism for feeding material to a point within said boundaries; and means responsive to variations in radiant energy emitted by such heated portions for controlling said mechanism.

26. The combination of means for applying a localized high-temperature heating medium to a metal body; mechanism for causing continuous relative movement of said body and such heating means to heat successive portions of said body; a device operated in timed relation with said mechanism for feeding solid material to said body; and automatically regulatable means for independently heating said material and for maintaining the latter at a substantially uniform selected temperature.

27. The combination of means for applying a localized high-temperature heating medium to a metal body; a device for feeding solid material to be deposited on said body; means for applying heat to said material; and means responsive to variations of a thermal condition of such material for regulating the last mentioned heat applying means.

28. The combination of means for applying a localized high-temperature heating medium to a metal body; mechanism for causing continuous relative movement of said body and such heating means to heat successive portions of said body; a device operating in timed relation with said mechanism for feeding solid material to be deposited on said body; means for heating said material; and means responsive to variations of a thermal condition of such material for regulatably varying the amount of heat applied thereto.

29. The combination of means for applying a localized pre-heat to a metal body; means for applying a localized high-temperature heating medium to said metal body; mechanism for causing continuous relative movement of said body and such heating means to heat successive portions of said body; a device driven by said mechanism for feeding material to be deposited on said body; and means responsive to variations in radiant energy emitted by such heated portions for controlling said mechanism.

30. The combination of means for pre-heating localized portions of a metal body; means for applying a localized high-temperature heating medium to said portions; a device for feeding solid material to be deposited on said body; means for heating said material; and means responsive to variations in radiant energy emitted by such material for controlling the heat applied thereto.

31. The combination of means for pre-heating localized areas of a metal body; means for applying a localized high-temperature heating medium to said areas; a device for feeding material to be deposited on said body; means responsive to variations of a thermal condition of such localized heated areas for controlling said device; means for heating said material; and means responsive to variations of a thermal condition of such material for controlling the heat applied thereto.

32. The combination of means for pre-heating localized areas of a metal body; means for applying a localized high-temperature heating medium to said areas; mechanism for causing continuous relative movement of said body and such heating means to heat successive areas of said body; means responsive to variations of a thermal condition of such heated areas for controlling said mechanism; a device operating in timed relation with said mechanism for feeding material to be deposited on said body; means for heating said material; and means responsive to variations of a thermal condition of such material for controlling the heat applied thereto.

33. A welding process which comprises, applying a localized high-temperature heating medium to the work; continuously moving the work and said heating medium relative to each other to heat successive portions of the work; feeding solid material to be deposited on said work in proportion to the relative movement between said work and heating medium; and controlling the relative movement of the work and the heating medium in response to variations in radiant energy emitted by said heated portions.

34. A welding process which comprises, applying a localized high-temperature heating medium to the work; continuously moving the work and said heating medium relative to each other to heat successive portions of the work; feeding solid material to be deposited on the work; heating said material before it is deposited on the work; and regulating the heat so applied to said material in response to variations of a thermal condition of such heated material.

HOMER W. JONES.